Nov. 21, 1967 J. J. SCHULZE 3,353,281

TRANSPORT CARRIER AND PICTURE COMPOSITE

Filed June 17, 1965

Inventor:
John J. Schulze
By:
Mason, Kolehmainen, Rathburn & Wyss
Attys.

United States Patent Office 3,353,281

Patented Nov. 21, 1967

3,353,281

TRANSPORT CARRIER AND PICTURE COMPOSITE

John J. Schulze, Prospect Heights, Ill., assignor to Addressograph-Multigraph Corporation, Mount Prospect, Ill., a corporation of Delaware Filed June 17, 1965, Ser. No. 464,750

2 Claims. (Cl. 35—28)

ABSTRACT OF THE DISCLOSURE

There is provided in combination a transport carrier for mounting transparencies in superimposed position so that assembly of carrier and transparencies can be passed through a photocopying machine. Means are provided on the carrier and transparencies for aligning the transparencies and for retaining the transparencies in assembled position. Moreover a transparent sheet cover overlies the transparencies to facilitate the passage thereof to the photocopying machine.

The present invention relates to a transport carrier and a picture composite therewith, and, more particularly, to a transport carrier for mounting a plurality of transparencies in superimposed position to form a composite picture, and to provide a carrier for passing the picture composite through a photocopying or other reproducing machine to provide duplicate images of the picture composite.

It is known to build up a composite picture where the individual components of the picture are formed on transparencies which are superimposed one upon another. One use of such composite pictures is by law enforcement agencies to form a composite face or image of a suspected criminal. Various features, such as eyes, hair, ears, and the like, would be drawn on different transparencies and the transparencies would be superimposed and adjusted with one another in order to select the features of the suspect. Thereafter the composite picture would be reproduced into a single image for distribution to other law enforcement agencies, newspapers, and the like. It is, of course, necessary in the compiling of such a composite picture that the features be accurately aligned in their finally adjusted relation on top of each other and that the composite picture be run through a suitable reproducing machine to provide the necessary copy of the composite.

Accordingly, one object of the present invention is to provide a new and improved transport carrier suitable for use with a photocopying machine.

A further object of the present invention is to provide a new and improved combination picture composite and transport carrier.

Yet a further object of the present invention is to provide a new and improved transport carrier for use with mounting a plurality of transparencies in a superimposed position and which maintains the transparencies in accurately aligned position relative to each other.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved transport carrier for mounting a plurality of transparencies in superimposed position. The improved transport carrier includes a thin, flexible backing sheet with an aligning strip secured near one edge thereof. The aligning strip is provided with suitable notches or projections to provide for alignment with transparencies. A thin, flexible, transparent sheet ribbon is secured over the strip and extends beyond the aligning means to define a channel to receive the edges of the transparencies. In the illustrated embodiment of the present invention, the aligning means includes a first V-shaped notch in the edge of the aligning strip. The transparencies include complementary notches to accurately align the transparencies on the carrier. Further, the multiple notches permit adjusting the transparencies with one another so that the location of the various features with respect to the facial outline can be varied and the final adjustments of the various transparencies maintained in a fixed position with one another on the carrier. It will be readily apparent that the arrangement of notches and projections may be reversed with respect to the aligning means and the transparencies and that a combination of notches and projections may be employed to give the equivalent results. Moreover, to provide for passing the composite picture through a photocopying machine, a thin, transparent, flexible sheet cover film has a first portion overlaying the transparencies and has a second portion folded back around the sheet so that the folded edge thereof may be fed into the copying machine.

The present invention also is directed to a transport carrier in combination with suitable transparencies so that a composite picture is built up. In order to accommodate a plurality of the transparencies, the aligning strip has a thickness greater than the thickness of a plurality of the transparencies. In this manner a number of transparencies can be received in the groove formed between the flexible ribbon and the backing sheet and the aligning means on the aligning strip and transparencies will cooperate to accurately position the transparencies in superimposed relation.

For a better understanding of the present invention, reference may be had to the accompanying drawing wherein.

Figure 2:
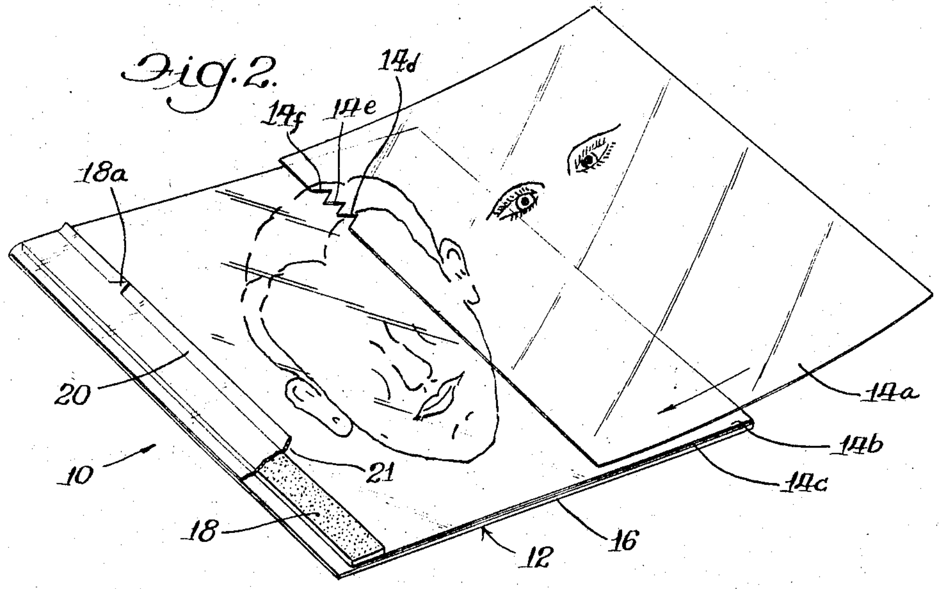
FIG. 2 is an isometric view of a composite picture and transport assembly.

Referring now to the drawing, there is illustrated a composite assembly 10 including a transport carrier 12 and a plurality of transparencies **14*a*, 14*b*, 14*c*, hereinafter collectively referred to as 14. The transport carrier is adapted for mounting and holding the plurality of transparencies 14 in a superimposed position to provide a composite picture of a face or other object. The transport carrier 12 accordingly includes a thin, flexible backing sheet 16. An aligning strip 18 is secured in any suitable manner as by gluing adjacent one edge of the backing sheet 16 to the upper surface thereof. The edge of the aligning strip 18 remote from the edge of the backing strip 16 is provided with suitable aligning means for the transparencies; in the illustrated embodiment the aligning means includes a V-shaped projection 18*a*** in the edge of the aligning strip.

To provide a channel to receive the edges of the transparencies, there is provided a thin, flexible ribbon 20 secured over the aligning strip 18 and extending beyond the aligning means of the strip. In this manner a channel 21 is defined with the backing sheet to receive the edge of a transparency. It will be understood that the aligning strip 18 has a thickness greater than the thickness of the number of transparencies which would normally be superimposed on the backing sheet 16 so that the edges of the transparencies may be freely received within the channel 21.

To provide for passage of the transport carrier through a photocopying machine or like device, the composite assembly 10 includes a thin, transparent, flexible sheet film cover 23 having a first portion 23*a* overlaying the transparencies and having a second portion 23*b* folded back around the edge of the sheet.

The transparencies adapted to be superimposed on other transparencies are formed of a thin, flexible transparent sheet, as illustrated at 14*a*, 14*b*, and 14*c*, and are provided with suitable complementary aligning means to cooperate with the projection 18*a*.

More specifically, each of the transparent sheets has a plurality of V-shaped notches 14*d*, 14*e*, and 14*f*, complementary to the projection 18*a*, for the accurate alignment of the transparencies with respect to each other. Insertion of projection 18*a* into one of the notched portions 14*d*, 14*e* or 14*f* permits varying the location of the various features with respect to the facial outline. It will be seen that the transparencies can be inserted in channel 21 in only one direction and that the transparencies will be aligned, by first abutting against the inner edge of the aligning strip 18, and secondly, by engagement of the aligning grooves and projections of the aligning strip 18 and the transparencies 14.

It is understood that the configuration of the projections or the notched portions is not critical and they may assume any suitable configuration the requirement being that they form a mating relationship.

Figure 1:
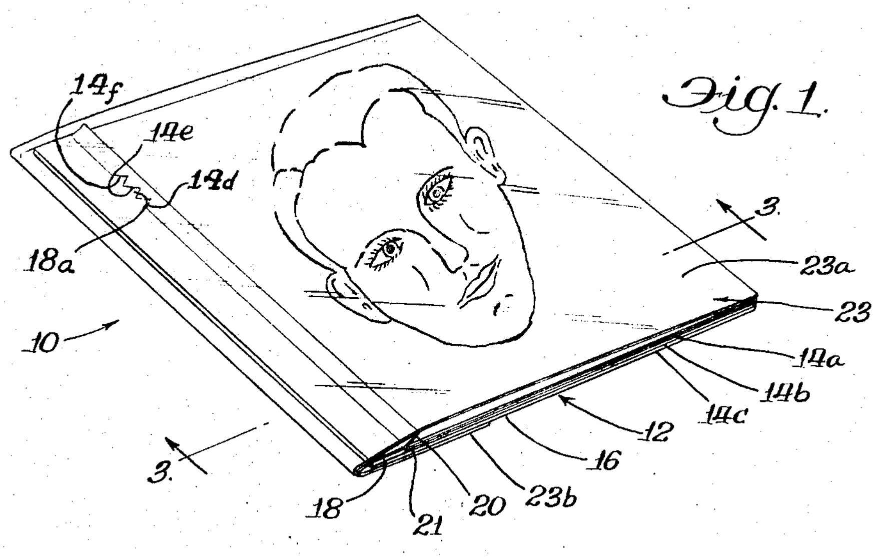
FIG. 1 is a partially exploded isometric view of a composite picture and transport carrier assembly shown with the flexible cover removed and illustrated with the transparencies in the process of assembly.
Figure 3:
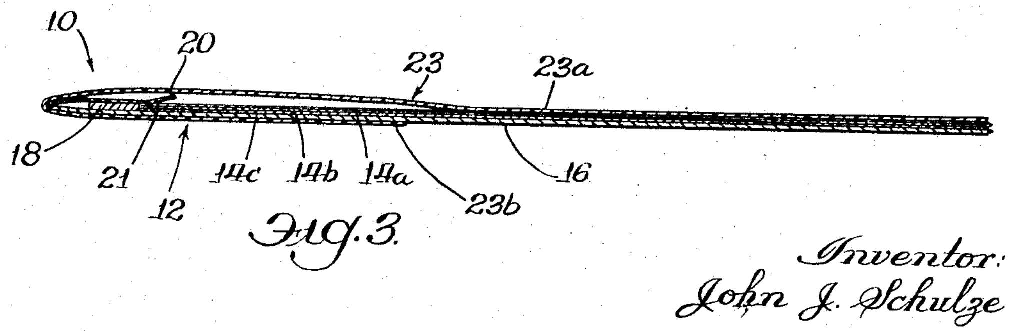
FIG. 3 is a cross sectional view of the assembled transport carrier and transparencies, taken along line 3—3 of FIG. 2.

From the above detailed description of the invention, its operation and use is believed clear. However, briefly, it will be understood that where it is desired to build up a picture from a number of individual features, it would be necessary to first select the desired features, such as the facial outline and hair of a face, and to superimpose other features on top of this. As best illustrated in FIG. 1, the transparency 14*a* includes eye features so that a selected eye shape or configuration can be superimposed upon the outline formed by the transparencies below it. Once the composite picture has been assembled, the transport carrier 12 including the transparencies 14 can be assembled within the cover 23 and the composite assembly may be run through photocopying or other reproducing devices.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. In combination a transport carrier for mounting a plurality of transparencies in superimposed position and including a thin, flexible backing sheet, an aligning strip secured to one surface of said sheet adjacent one edge thereof and having a substantial thickness compared to said sheet and provided with aligning means in a first edge remote from said one edge of said sheet, a thin, flexible ribbon secured over said strip and extending beyond said first edge of said strip to define a channel, a thin, transparent, flexible sheet cover having a first portion overlying said one surface of the carrier and having a second foldover portion extending around one edge of said carrier; and a plurality of superimposed transparencies positioned on said sheet having their top edges received in said channel and provided with aligning means in their top edge engaging the first mentioned aligning means in complementary relation thereto, one of said aligning means including a protuberance and the other of said aligning means including a protuberance receiving notch portion whereby each of said transparencies is received in said carrier in a predetermined position.

2. The combination of claim 1 wherein said protuberance receiving portion comprises a plurality of adjacent V-shaped notches selectively cooperable with said protuberance.

References Cited

UNITED STATES PATENTS

| | | | |
|---|---|---|---|
| 1,258,146 | 3/1918 | Russell | 40—140 |
| 2,560,725 | 7/1951 | Jones | 129—20 |
| 2,624,502 | 1/1953 | Evans | 229—71 |
| 2,964,042 | 12/1960 | Hawley | 129—16 |
| 2,974,426 | 3/1961 | McDonald | 35—26 |
| 3,091,046 | 5/1963 | Engelstein | 129—20 X |
| 3,281,977 | 11/1966 | Koontz | 40—158 |

EUGENE R. CAPOZIO, *Primary Examiner.*

H. S. SKOGQUIST, *Assistant Examiner.*